United States Patent
North et al.

(10) Patent No.: US 11,368,462 B2
(45) Date of Patent: Jun. 21, 2022

(54) SYSTEMS AND METHOD FOR HYPERTEXT TRANSFER PROTOCOL REQUESTOR VALIDATION

(71) Applicant: ServiceNow, Inc., Santa Clara, CA (US)

(72) Inventors: Alexander North, Santa Clara, CA (US); Minaxi Pauranik, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 561 days.

(21) Appl. No.: 16/123,975

(22) Filed: Sep. 6, 2018

(65) Prior Publication Data
US 2020/0084216 A1  Mar. 12, 2020

(51) Int. Cl.
*H04L 9/40* (2022.01)

(52) U.S. Cl.
CPC .......... *H04L 63/101* (2013.01); *H04L 63/083* (2013.01)

(58) Field of Classification Search
CPC ................. H04L 63/101; H04L 63/083; H04L 29/06829; H04L 63/08; G06F 21/31
See application file for complete search history.

(56) References Cited

U.S. PATENT DOCUMENTS

| | | | |
|---|---|---|---|
| 6,321,229 B1 | 11/2001 | Goldman | |
| 6,678,887 B1 | 1/2004 | Hallman | |
| 7,020,706 B2 | 3/2006 | Cates | |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |
| 8,612,408 B2 | 12/2013 | Trinon | |
| 8,646,093 B2 | 2/2014 | Myers | |
| 8,832,652 B2 | 9/2014 | Mueller | |
| 9,065,783 B2 | 6/2015 | Ding | |

(Continued)

OTHER PUBLICATIONS

R. Fielding (ed.) and J. Reschke (ed.), "RFC7230: Hypertext Transfer Protocol (HTTP/1.1): Message Syntax and Routing", Internet Engineering Task Force (IETF) (Jun. 2014) (Year: 2014).*

*Primary Examiner* — Theodore C Parsons
(74) *Attorney, Agent, or Firm* — Fletcher Yoder PC

(57) ABSTRACT

HTTP requests and responses may be transmitted between cloud-based application instances. Each outgoing HTTP request may include authentication credentials and an "X-Snc-Integration-Source" header that identifies the source of the request. A table of approved users may be maintained, including each user's authentication credentials and one or more source instances from which they are expected to generate HTTP requests. When the HTTP request is received, the HTTP request will be parsed to identify the authentication credentials and the source of the request. The table of authorized users is then referenced to determine if the authentication credentials and the source of the request match those of an authorized user. If the authentication credentials and the source of the request match those of an authorized user, access will be granted. If the authentication credentials and the source of the request do not match those of an authorized user, access will be denied.

19 Claims, 7 Drawing Sheets

(56) References Cited

U.S. PATENT DOCUMENTS

| | | |
|---|---|---|
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 4/2017 | Mueller |
| 9,654,473 B2 | 5/2017 | Miller |
| 9,654,833 B2 | 5/2017 | Mueller |
| 9,766,935 B2 | 9/2017 | Kelkar |
| 9,805,322 B2 | 10/2017 | Kelkar |
| 2005/0204148 A1* | 9/2005 | Mayo ................ H04L 63/0815 713/185 |
| 2006/0184533 A1* | 8/2006 | Koganei ............ H04N 21/8402 |
| 2010/0274859 A1* | 10/2010 | Bucuk ................. H04L 67/104 709/206 |
| 2012/0039326 A1* | 2/2012 | Chia .................. H04L 63/0853 370/342 |
| 2014/0189808 A1* | 7/2014 | Mahaffey ............ H04L 63/0853 726/4 |
| 2014/0245372 A1 | 8/2014 | Elias et al. |
| 2015/0222664 A1 | 8/2015 | Battre et al. |
| 2015/0334108 A1* | 11/2015 | Khalil ................... H04W 12/06 726/8 |
| 2018/0359259 A1* | 12/2018 | Leon ...................... G06F 9/445 |
| 2019/0124063 A1* | 4/2019 | Cui ....................... H04L 63/083 |
| 2019/0394032 A1* | 12/2019 | Vudathu .............. H04L 9/3239 |
| 2019/0394204 A1* | 12/2019 | Bansal ................. H04L 63/102 |
| 2020/0358755 A1* | 11/2020 | Abdul ..................... H04L 67/10 |

\* cited by examiner

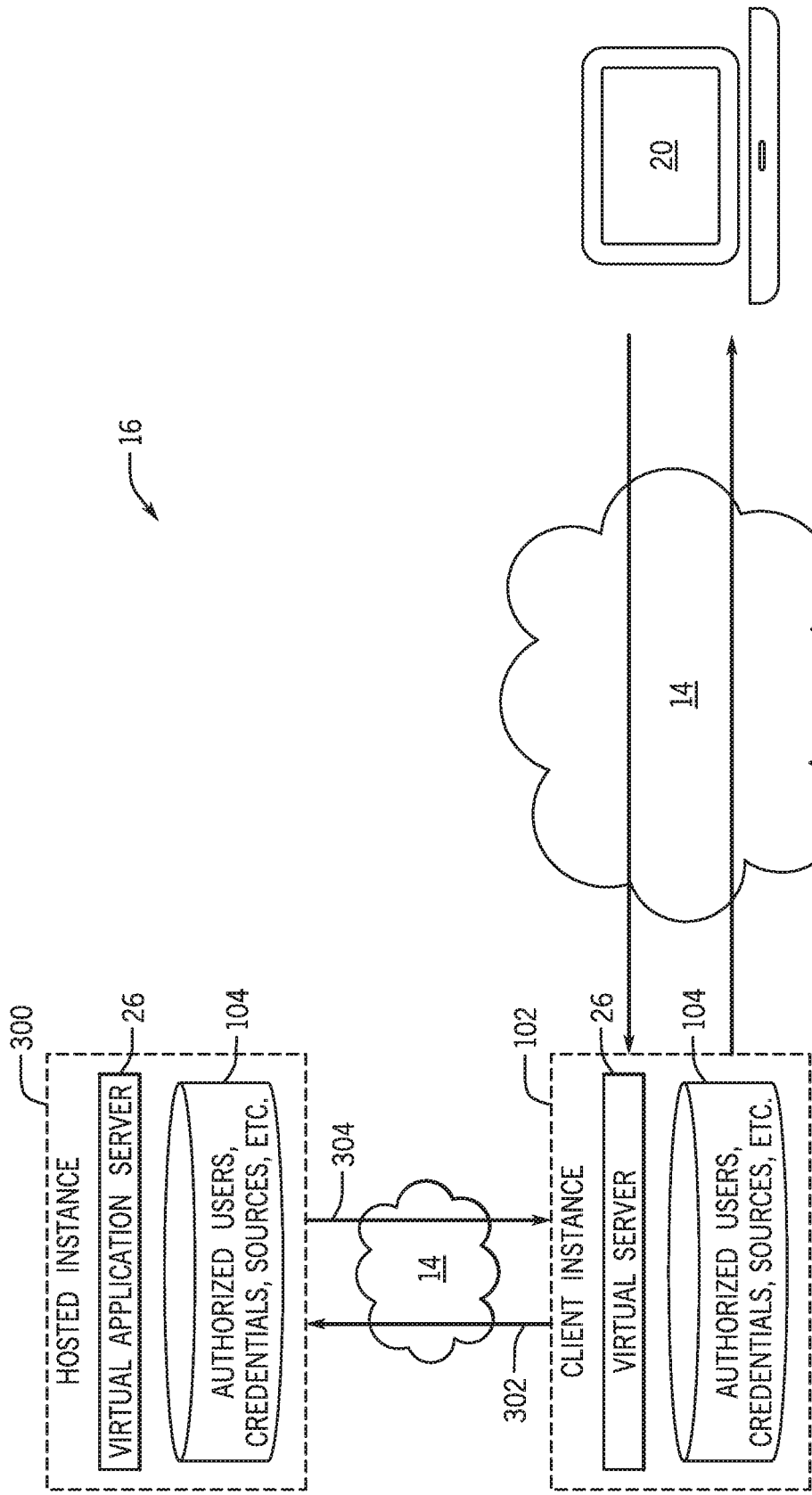

302

```
GET
/api/ now /v2 /table /change_request?sysparm_limit=5000&syspar
m_display_value=all&sysparm_suppress_pagination_header=Tru
e&sysparm_offset=0&sysparm_query=numberINCHG5001601
HTTP/1.1                                                                    400
> Host: example.service-now.com
> Authorization: Basic edeM0Ewa2bKh4xWD5ulEJW5Yp3DC5CyT
> Cookie: BIGipServerpool example=2256537098.36670.0000;
JSESSIONID=724C03304A01C9837AA9B24AB9F041CD;
glide_session_store=E7109FC44FB317006FCCA1618110C7D4;    402
glide_use_route=glide.acbac97ba9d98eea2570a88dd45a2caa
> X-Snc-Integration-Source:329f78ff6f76c280d54da9cc5d3ee406
> User-Agent:Jakarta Commons-HttpClient/3.1
> Accept: */*
```

```
< HTTP /1.1 401 Unauthorized  ——404
JSESSIONID="D7DBC71F33F62F737AEFB393E34EABD2" for domain
example.service-now.com, path /, expire 0
< Set-Cookie: JSESSIONID=D7DBC71F33F62F737AEFB393E34EABD2;
Path=/; HttpOnly;Secure
< WWW-Authenticate: BASIC realm="Service-now"
< Pragma: no-store,no-cache
< Cache-control: no-cache,no-store,must-revalidate,max-age=-1
< Expires: 0
< Content-Type: application /json;charset=UTF-8
< Transfer-Encoding: chunked
< Date: Fri, 03 Aug 2018 23:32:29 GMT
< Server: ServiceNow
< Strict-Transport-Security: max-age=63072000; includeSubDomains
< Connection: close
```

FIG. 6

SYSTEMS AND METHOD FOR HYPERTEXT TRANSFER PROTOCOL REQUESTOR VALIDATION

BACKGROUND

The present disclosure relates generally to hypertext transfer protocol (HTTP) requests, and more specifically, to validating a requestor of an HTTP request.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Cloud-based applications may be implemented using virtual server instance or instantiation accessible via a public or private cloud network, which may be colloquially referenced as instances. Various instances (e.g., a client instance and a hosted instance) may communicate with one another and exchange data with one another by exchanging HTTP requests and HTTP responses. In some cases, the sender of an HTTP request may be authenticated by including authentication credentials (e.g., user name and password) in the HTTP request. This is referred to as basic access authentication (or "BasicAuth"). Authentication credentials of an authorized user that are borrowed or stolen and used by an unauthorized user to generate HTTP requests may present a security risk that is difficult to detect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter relates to HTTP requests transmitted between cloud-based application instances. Each outgoing HTTP request may include authentication credentials and an "X-Snc-Integration-Source" HTTP header that identifies the source of the request. A table of approved users may be maintained, including each user's authentication credentials and one or more source location identifier from which they are expected to generate HTTP requests. When the HTTP request is received, the HTTP request will be parsed to identify the authentication credentials and the source of the request. The table of authorized users is then referenced to determine if the authentication credentials and the source of the request match those of an authorized user. If the authentication credentials and the source of the request match those of an authorized user, access will be granted. If the authentication credentials and the source of the request do not match those of an authorized user, access will be denied.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is a block diagram illustrating an embodiment in which a virtual server supports and enables a client instance, in accordance with aspects of the present disclosure;

FIG. 5 is an example of an outbound HTTP request made by a client instance to a hosted instance, in accordance with aspects of the present disclosure;

FIG. 6 is an example of an HTTP response from the hosted instance to the client instance indicating that access has been denied, in accordance with aspects of the present disclosure;

DETAILED DESCRIPTION

Figure 1:
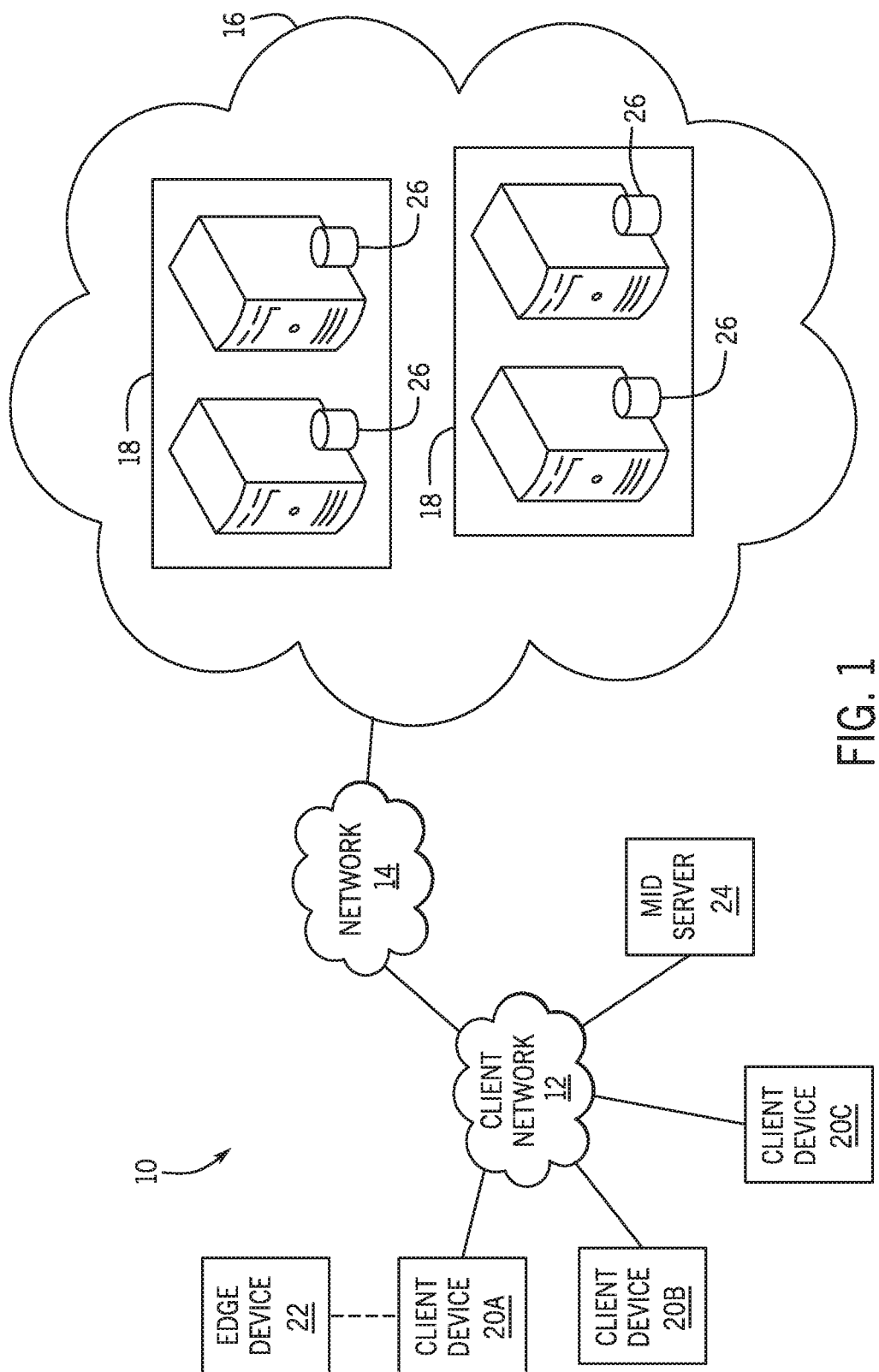
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Cloud-based application instances (e.g., a client instance and a hosted instance) may communicate with one another and exchange data by exchanging HTTP requests and HTTP responses. HTTP requests may include authentication credentials (e.g., user name and password) to authenticate the sender of the HTTP request. Authentication credentials of an authorized user that are shared or stolen and used by an unauthorized user to generate HTTP requests may present a security risk that is difficult to detect. By including a header in outgoing HTTP requests that identifies the source of the request, and maintaining a record of which nominated systems (e.g., computing devices, smart devices, computational instances, application instances, virtual machines, etc.) an authorized user utilizes to generate requests, it may be easier to determine when shared or stolen credentials are being used by an unauthorized user. For example, a table of approved users may be maintained, including each user's authentication credentials and one or more source systems from which they are expected to generate HTTP requests. When the HTTP request is received, the HTTP request is parsed to identify the authentication credentials and the source of the request. The table of authorized users is then referenced to determine if the authentication credentials and the source of the request match those of an authorized user. If the authentication credentials and the source of the request match those of an authorized user, access will be granted. If the authentication credentials and the source of the request do not match those of an authorized user, access will be denied.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
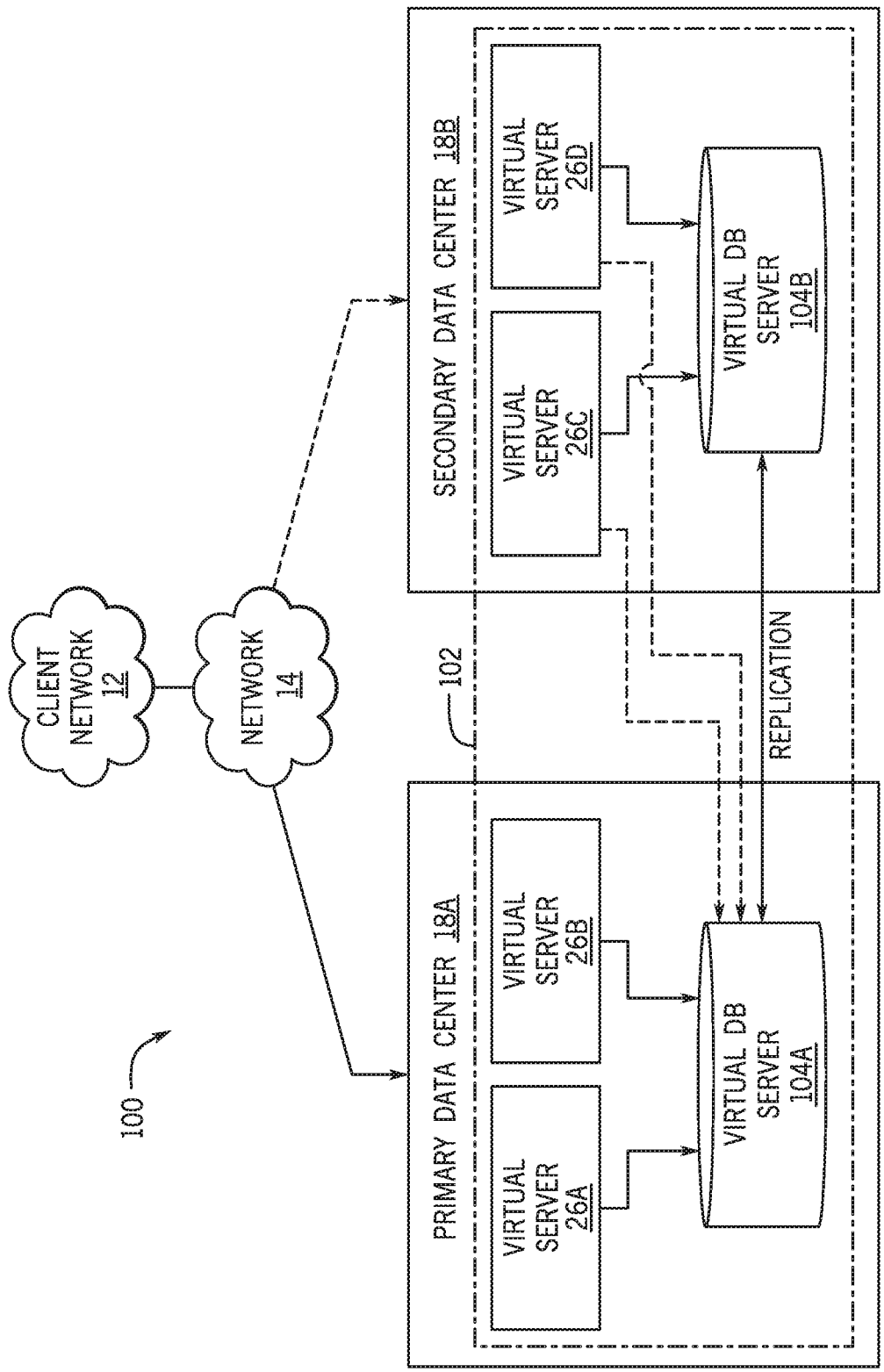
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B (e.g., via the network 14).

As shown in FIG. 2, the primary virtual database server 104A may backup data to the secondary virtual database server 104B using a database replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
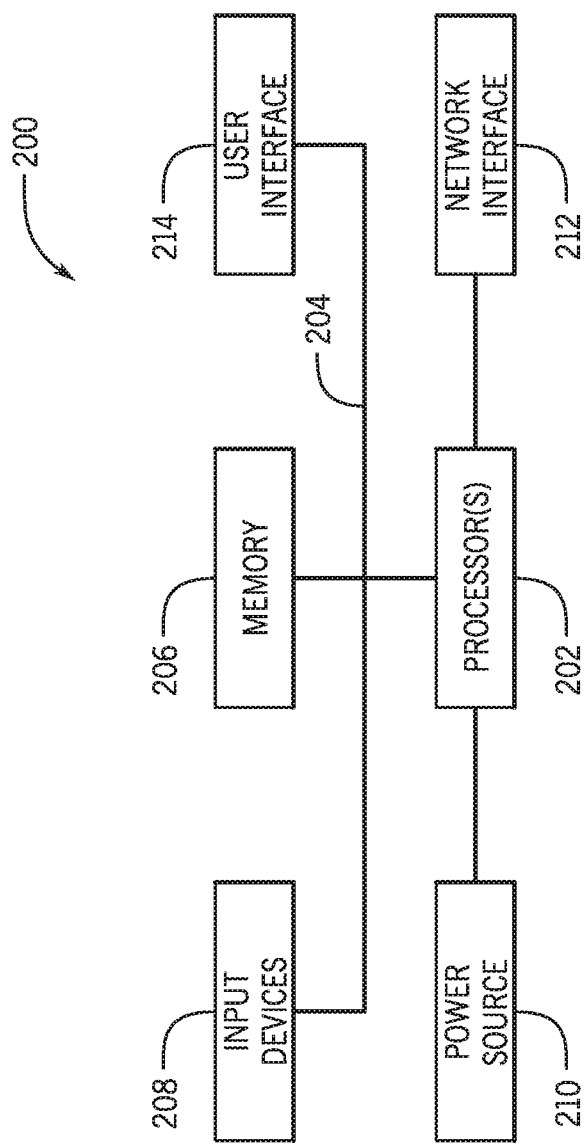
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

The client instance 102 may also be configured to communicate with other instances, such as the hosted instance 300 shown in FIG. 4, which may also include a virtual application server 26 and a virtual database server 104. As shown, the instances 102, 300 may communicate with one another via HTTP requests 302 and HTTP responses 304 transmitted between the client instances 102 and the hosted instance 300 via the network 14. In some embodiments, the receiving instance (e.g., the hosted instance 300) may validate the requestor of the HTTP request 302 according to basic access authentication, also known as "BasicAuth" before providing the HTTP response 304. For example, the hosted instance 300 may have access to one or more tables (e.g., stored on the virtual database server 104) that include authorized users, their credentials, sources from which the authorized users may send HTTP requests 302, etc. The HTTP request 302 may include authentication credentials (e.g., username and password) in the header or the body of the request 302. The authentication credentials may be retrieved (e.g., from a relational database management system or RDBMS). The authentication credentials may have been previously entered by a user (e.g., via web browser, a program or application, or some other interface) or filled by a password management program. Upon receiving an HTTP request 302, the receiving instance 300 may parse the HTTP request 302 identify the authentication credentials and reference the database 104 to determine if the provided authentication credentials match authentication credentials stored in the database 104. If the provided authentication credentials match authentication credentials stored in the database 104, the receiving instance 300 may authorize access and prepare and transmit an HTTP response 304 with the requested data. If the provided authentication credentials do not match authentication credentials stored in the database 104, the receiving instance 300 may deny access and prepare and transmit an HTTP response 304 indicating that access has been denied.

In some cases, authentication credentials may be borrowed or stolen and used by someone other than the person for whom the authentication credentials were intended. In such a situation, the HTTP request 302 would pass basic access authentication as long as the authentication credentials are valid and found in the database 104 or other suitable data store. An augmented basic access authentication may associate a set of authentication credentials with a source (e.g., client instance 102) from which the user is expected to generate HTTP requests 302. Accordingly, credential records in the database 104 may be associated with one or more possible sources, such that, in some embodiments, in order to gain access, the authentication credentials must match a set found in the database 104 and the source of the HTTP request 302 must match one or more sources associated with the authentication credentials. The source identification may be pulled from a glide properties file upon startup of the source instance and included in the HTTP request 302.

FIG. 5 is an example of an outbound HTTP request, indicated by element number 302, made by a client instance (e.g., client instance 102 from FIG. 4). Specifically, the HTTP request is a request to pull up to 5000 change request records from the target instance (e.g., the hosted instance 300 shown in FIG. 4). However, it should be understood that other HTTP requests may be used to perform a wide range of tasks. As shown, the HTTP request, indicated by element number 302, includes an authorization header 400, which includes the authentication credentials provided by the user. The authentication credentials may or may not be encrypted or coded. The HTTP request, indicated by element number 302, also includes an X-Snc-Integration-Source header 402, which identifies the source of the request (e.g., client instance 102 from FIG. 4). The source identification may include, for example, a string pulled from the glide properties file upon startup of the instance. As with the authentication credentials, the source may or may not be encrypted or coded. Upon receipt of the request, the authentication credentials and the source of the request may be checked against the list of approved users, their authentication credentials, and the approved sources. If the provided authentication credentials and source match a user on the approved user list, access is granted. The receiving instance may then prepare and transmit an HTTP response containing or accompanying the information requested in the HTTP request. However, if both the provided authentication credentials and source do not match a user on the approved user list, access is denied and an HTTP response indicating that access has been denied is generated and transmitted.

Figure 8:
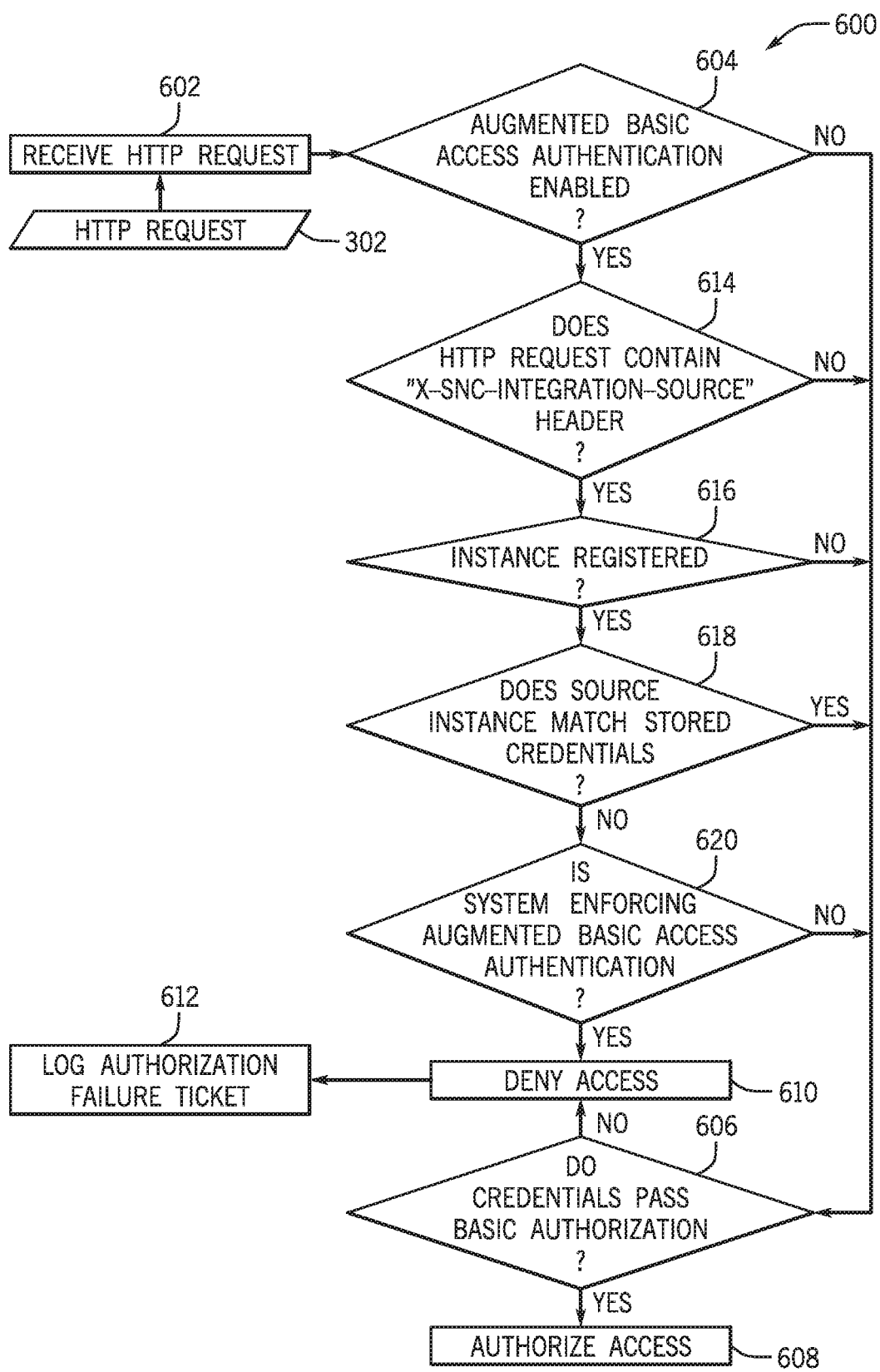
FIG. 8 is a flow chart of a process for processing the HTTP request, in accordance with aspects of the present disclosure.

To prevent users from manually adding X-Snc-Integration-Source header to HTTP requests ("spoofing" headers) to gain access, an entity implementing augmented basic access authentication may also implement a policy against manually adding headers to HTTP requests, such that a person caught doing so may be subject to discipline. FIG. 6 is an example of an HTTP response, indicated by element number 304, indicating that access has been denied. As shown in line 404, the HTTP response includes a 401 error code that the requesting user is not authorized to access the requested data. FIG. 8 and the corresponding discussion describe how HTTP requests are processed and whether access is granted or denied in more detail.

Figure 7:
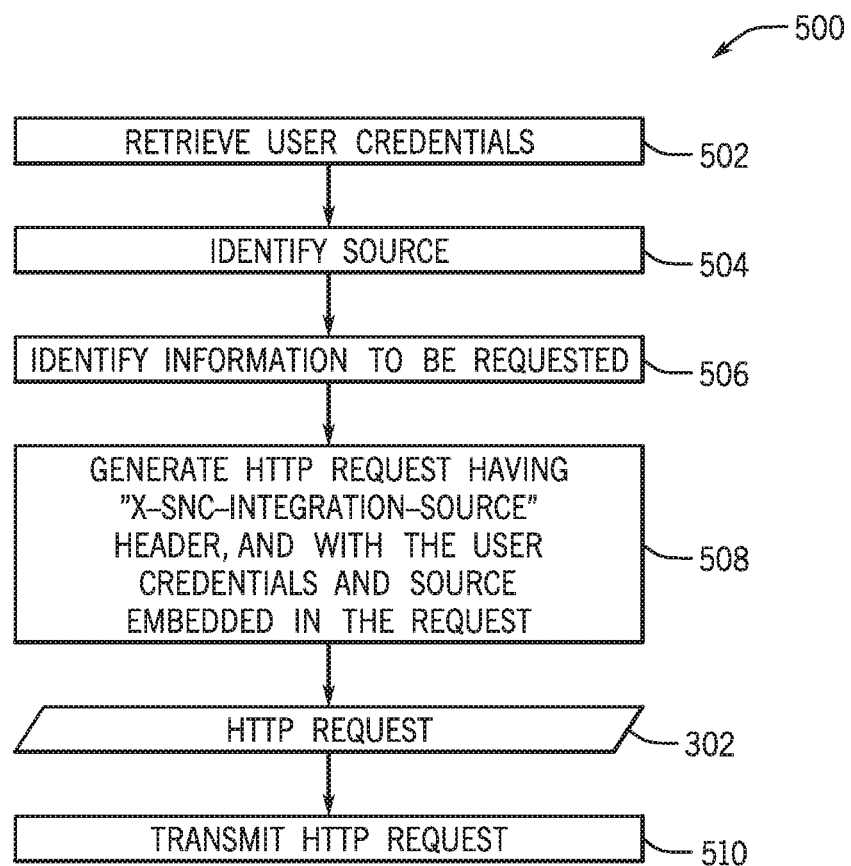
FIG. 7 is a flow chart of a process for generating the HTTP request using an augmented basic access authentication scheme, in accordance with aspects of the present disclosure.

FIG. 7 is a flow chart of a process 500 for generating an HTTP request using an augmented basic access authentication scheme. At block 502, user authentication credentials are retrieved (e.g., from a relational database management system or RDBMS). As previously described, the authentication credentials may have been previously provided by the user (e.g., via a user interface), or provided by a password management system (e.g., a standalone password managing application, a feature of a web browser, a web browser plugin, etc.). At block 504, the source of the HTTP request is identified. The source identification may include, for example, a string pulled from the glide properties file upon startup of the instance. At block 506, the information to be requested is identified.

At block 508, the HTTP request is generated. The HTTP request includes the "X-Snc-Integration-Source" header, which identifies the source of the request. The source of the request may or may not be encrypted or coded. The HTTP request also includes the authentication credentials. As described with regard to FIG. 5, the authentication credentials may be provided in an authorization header. In other embodiments, the authentication credentials may be included in the body of the HTTP request, or embedded in the request in some other way. An X-Snc-Integration-Source header, which identifies the source of the HTTP request will automatically be included in any outgoing HTTP requests originating from instances on the platform. At block 510, the HTTP request is transmitted to the receiving instance.

Once the HTTP request is received by the receiving instance, the HTTP request is processed. FIG. 8 is a flow chart of a process 600 for processing an HTTP request. At block 602, the HTTP request is received from the requesting instance (e.g., client instance). At block 604, the process determines whether or not augmented basic access authentication is enabled. In some embodiments, whether or not augmented basic access authentication is enabled may be determined based on the HTTP request. In other embodiments, whether or not augmented basic access authentication is enabled may be set by a network administrator. Accordingly, another component or a locally or remotely stored table (e.g., glide properties file) may be consulted to determine whether or not augmented basic access authentication is enabled. In another embodiment, the receiving instance may be notified when augmented basic access authentication is enabled or disabled such that the receiving instance always knows whether or not augmented basic access authentication is enabled.

If augmented basic access authentication is disabled, the process 600 proceeds to block 606 and determines whether the provided credentials pass basic authorization. This may include, for example, comparing the authentication credentials provided via the HTTP request 302 to a table or list of authorized users to determine whether or not the authentication credentials are associated with an authorized user. If the authentication credentials are associated with an authorized user, the process 600 proceeds to block 608 and authorizes access. This may result in an HTTP response being generated with the requested information and transmitted back to the requesting instance.

If the authentication credentials are not associated with an authorized user, the process 600 proceeds to block 610 and denies access. In some embodiments, the process 600 may log an authorization failure ticket (block 612), so the failed authorization may be flagged and possibly investigated.

Returning to block 604, if the augmented basic access authentication is enabled, the process proceeds to block 614 and parses the HTTP request 302 to determine whether or not the HTTP request 302 contains the "X-Snc-Integration-Source" header. If the HTTP request 302 does not contain the "X-Snc-Integration-Source" header, the process 600 proceeds to block 606 and determines if the provided authentication credentials pass basic authorization. If the HTTP request 302 does contain the "X-Snc-Integration-Source" header, the process 600 proceeds to block 616 and determines whether or not the requesting instance associated with the HTTP request 302 is registered. If the requesting instance is not registered, the process 600 proceeds to block 606 and determines whether the authentication credentials in the HTTP request bass basic authorization. If the requesting instance is registered, the process proceeds to block 618 and determines whether the source instance matches the stored authentication credentials. In some embodiments, the process 600 may skip block 616 and proceed from block 614 directly to block 618.

If the source instance matches the stored authentication credentials, the process proceeds to block 606 and determines whether the authentication credentials in the HTTP request pass basic authorization. If the source instance does not match the stored authentication credentials, the process 600 proceeds to block 620 and determines whether the system is enforcing augmented basic access authentication. As a system begins using augmented basic access authentication, the system may start in a learning mode in which HTTP requests are received and/or intercepted and a database of source instances from which authorized users send HTTP requests is built up. Once augmented basic access authentication is implemented, whenever new authentication credentials are issued to a user, the instance or instances from which that user plans to issue HTTP requests are noted and logged. Accordingly, when the system is in learning mode (i.e., augmented basic access authentication is enabled but not being enforced), the system may track sources and authentication credentials without denying access if a source does not match authentication credentials. A locally or remotely stored table (e.g., glide properties file) may be consulted to determine whether or not augmented basic access authentication is being enforced. If the system is not enforcing augmented basic access authentication, the process 600 proceeds to block 606 and determines whether the authentication credentials in the HTTP request bass basic authorization. If the system is enforcing augmented basic access authentication, the process proceeds to block 610 and denies access. An authentication failure ticket may then be logged. By monitoring the sources from which HTTP requests are sent and maintaining a list of sources from which authorized users are expected to send HTTP requests, HTTP requests sent from unexpected sources may be used to detect stolen or borrowed authentication credentials being used. Thus, by implementing the disclosed augmented basic access authentication scheme, the use of borrowed or stolen credentials by unauthorized users may be detected and reduced or eliminated.

The disclosed subject matter relates to HTTP requests transmitted between cloud-based instances. Each outgoing HTTP request may include authentication credentials and an "X-Snc-Integration-Source" header that identifies the source of the request. A table of approved users may be maintained, including each user's authentication credentials and one or more source instances from which they are expected to generate HTTP requests. When the HTTP request is received, the HTTP request will be parsed to identify the authentication credentials and the source of the request. The table of authorized users is then referenced to determine if the authentication credentials and the source of the request match those of an authorized user. If the authentication credentials and the source of the request match those of an authorized user, access will be granted. If the authentication credentials and the source of the request do not match those of an authorized user, access will be denied.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a hosted instance hosted by a datacenter, wherein the hosted instance is configured to communicate with one or more client instances generated for one or more client networks, the hosted instance configured to perform operations comprising:
receiving a hypertext transfer protocol (HTTP) request sent to the hosted instance from a client instance of the one or more client instances;
determining that augmented basic access authentication is enabled;
in response to determining that augmented basic access authentication is enabled, determining that the HTTP request contains a first header, wherein the first header comprises a first character string identifying the first header as a source header and a second character string identifying the client instance as a source of the HTTP request, and wherein the first character string identifies an authentication protocol by which credentials are authorized;

determining, based on the first header, that the client instance is included in a registry;

in response to determining that the client instance is included in the registry, determining that the HTTP request contains a second header comprising a username and password associated with a user of the client instance; and authorizing access to the hosted instance for the client instance.

2. The system of claim 1, wherein the operations comprise:

retrieving one or more pieces of information requested in the HTTP request;

generating an HTTP response; and transmitting the HTTP response and the information requested in the HTTP request to the client instance.

3. The system of claim 1, wherein the operations comprise determining that the system is enforcing augmented basic access authentication.

4. The system of claim 1, wherein the operations comprise:

determining that the system is not enforcing augmented basic access authentication; and authorizing access to the hosted instance for the client instance in response to determining, based on the first header, that the client instance is included in the registry.

5. The system of claim 4, wherein the operations comprise updating an authorized users list to associate the username, the password, and the source with the user of the client instance, in response to determining that the username, the password, or the client instance, or a combination thereof, do not match the credentials associated with the user of the client instance on the authorized users list stored in the registry.

6. The system of claim 1, wherein the operations comprise:

determining that the username, the password, or the client instance, or a combination thereof, do not match the credentials associated with an approved user on an authorized users list stored in the registry; and generating and logging an authorization failure ticket in response to determining that the username, the password, or the client instance, or a combination thereof, do not match the credentials associated with an approved user on an authorized users list stored in the registry.

7. The system of claim 1, wherein the second character string identifying the client instance as the source of the HTTP request is extracted from a file upon a startup of the client instance.

8. A system, comprising:

a hosted instance hosted by a datacenter, wherein the hosted instance is configured to communicate with one or more client instances generated for one or more client networks, the hosted instance configured to perform operations comprising:

receiving a hypertext transfer protocol (HTTP) request sent to the hosted instance from a client instance of the one or more client instances;

determining that augmented basic access authentication is enabled;

in response to determining that augmented basic access authentication is enabled, determining that the HTTP request contains a first header, wherein the first header comprises a first character string identifying the first header as source header and a second character string identifying the client instance as a source of the HTTP request, and wherein the first character string identifies an authentication protocol by which credentials are authorized;

determining, based on the first header, that the client instance is included in a registry; and allowing or denying access to the hosted instance for the client instance based on whether the client instance matches credentials associated with an approved user on an authorized users list stored in the registry.

9. The system of claim 8, wherein the operations comprise:

determining that the system is not enforcing augmented basic access authentication; and allowing access to the hosted instance for the client instance in response to determining that a username, a password, and the client instance match the credentials associated with the approved user on the authorized users list stored in the registry.

10. The system of claim 9, wherein the operations comprise:

determining, in response to determining that the augmented basic access authentication is enabled and is not being enforced, that the system is in a learning mode; and in response to determining that the system is in the learning mode, adding entries to the authorized user list stored in the registry.

11. The system of claim 9, wherein the operations comprise updating the authorized users list to associate the username, the password, and the source with the approved user in response to determining that the username, the password, or the client instance, or a combination thereof, do not match the credentials associated with the approved user on the authorized users list stored in the registry.

12. The system of claim 9, wherein the operations comprise:

retrieving one or more pieces of information requested in the HTTP request;

generating an HTTP response; and transmitting the HTTP response and the information requested in the HTTP request to the client instance.

13. The system of claim 8, wherein the operations comprise:

determining that the system is enforcing augmented basic access authentication; and denying access to the hosted instance for the client instance in response to determining that a username, a password, or the client instance, or a combination thereof, do not match the credentials associated with the approved user on the authorized users list stored in the registry.

14. The system of claim 8, wherein the operations comprise generating and logging an authorization failure ticket in response to determining that a username, a password, or the client instance, or a combination thereof, do not match the credentials associated with the approved user on the authorized users list stored in the registry.

15. A method, comprising:

receiving a hypertext transfer protocol (HTTP) request sent to a hosted instance from a client instance;

determining that augmented basic access authentication is enabled;

in response to determining that augmented basic access authentication is enabled, determining that the HTTP request contains a first header, wherein the first header comprises a first character string identifying the first header as a source header and a second character string identifying the client instance as a source of the HTTP request, and wherein the first character string identifies an authentication protocol by which credentials are authorized; and in response to determining that the HTTP request contains a particular source header and that a username and password associated with a user of the client instance match credentials stored in a registry, authorizing or denying access to the hosted instance for the client instance based on whether the source, username, and password match credentials associated with an approved user on an authorized users list.

16. The method of claim 15, comprising:

retrieving one or more pieces of information requested in the HTTP request;

generating an HTTP response; and transmitting the HTTP response and the information requested in the HTTP request to the client instance.

17. The method of claim 15, comprising:

determining that the client instance identified as the source does not match credentials stored in the registry;

determining that augmented basic access authentication is not being enforced; and authorizing access to the hosted instance for the client instance.

18. The method of claim 17, comprising updating the registry to associate the source with a particular approved user.

19. The method of claim 15, comprising:

determining that the client instance identified as the source does not match credentials stored in the registry;

determining that augmented basic access authentication is being enforced; and denying access to the hosted instance for the client instance.

* * * * *